Patented Dec. 15, 1953

2,662,914

UNITED STATES PATENT OFFICE 2,662,914

ALPHA, ALPHA-VITAMIN A DIACID AND SYNTHESIS OF ISOPRENIC POLYENES

Charles D. Robeson, Rochester, N. Y., assignor to Eastman Kodak Company, Rochester, N. Y., a corporation of New Jersey No Drawing. Application April 22, 1950,
Serial No. 157,623

6 Claims. (Cl. 260—514)

This invention relates to isoprenic polyenes and methods of synthesizing such polyenes.

In synthesizing many organic materials such as carotenoids, tocopherols, phytol and the like, it is necessary to build up an isoprenic polyene structure containing at least one isoprene grouping as follows:

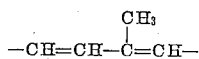

In many cases, this isoprenic grouping is a part of a complex molecule which may include a cyclic structure, a saturated or unsaturated hydrocarbon chain, or both.

It is accordingly an object of this invention to provide a new and useful method of synthesizing organic materials containing an isoprene grouping.

It is is a further object of the invention to provide an improved method of synthesizing materials useful in the synthesis of carotenoids, tocopherols, phytol and similar polyenes.

Another object of the invention is to provide a commercially feasible method of synthesizing isoprenic diacids and diesters.

Another object of the invention is to provide a method of increasing the chain length of isopropylidene malonate diesters.

Another object of the invention is to convert isopropylidene malonate diesters into polyenes containing an isoprenic group.

Another object of the invention is to provide isoprenic polyene diacids and diesters which are readily convertible to isoprenic polyene monoacids and alcohols.

Another object of the invention is to convert aldehydes into isoprenic polyenes of substantially longer chain length.

Another object of the invention is to provide a simple method of synthesizing an isoprenic group.

Another object of the invention is to provide new isoprenic polyene compounds.

Another object of the invention is to provide a method of reacting aldehydes and certain esters to obtain new organic compounds.

Another object of the invention is to facilitate organic syntheses by providing a new and useful condensation reaction.

Other objects will be apparent from description and claims which follow.

These and other objects are attained by means of this invention as described more fully hereinafter and as defined in the appended claims.

In accordance with this invention, an aldehyde is condensed with an isopropylidene malonate diester in the presence of a basic condensation catalyst whereby the carbonyl oxygen of the aldehyde splits off and the remainder of the aldehyde molecule joins to the δ-carbon atom of the diester to give a β-methyl-1,4-diene condensation product. This condensation product upon saponification yields the corresponding α,α-dicarboxy-β-methyl-1,4-diene. The utility of these diacids and diesters is at once apparent for such diacids and diesters can be reduced by means of a suitable reducing agent, as for example the ether-soluble metal hydrides such as lithium aluminum hydride, lithium borohydride or aluminum hydride, to the corresponding dialcohols; or the diacids can be completely decarboxylated to the corresponding polyene hydrocarbons or partially decarboxylated to the corresponding polyene monoacids which can be esterified and/or reduced to the corresponding monoalcohols.

Any of the well-known aldehydes can be employed in practicing this invention. Thus either straight-chain or cyclic aldehydes can be used, including both aliphatic and aromatic aldehydes. The cyclic aldehydes which are suitable include both carbocyclic aldehydes such as benzaldehyde and ionylidene acetaldehyde and heterocyclic aldehydes such as furfural. The aldehydes can be either saturated or unsaturated, and include olefinic and paraffinic aldehydes as well as alicyclic and aromatic aldehydes. The diverse character of the aldehydes which are suitable is illustrated by the fact that typical aldehydes suitable for practicing the invention include acetaldehyde, benzaldehyde, cinnamaldehyde, acrolein, furfuraldehyde, β-ionylidene acetaldehyde, butyraldehyde, and citral.

In like manner, any of the diesters of isopropylidene malonic acid can be employed and the ester groups can be the same or different groups including alkyl, aryl and aralkyl esters. Conveniently the esters are alkyl esters such as methyl, ethyl, propyl, butyl or similar alkyl esters but phenyl esters and phenylalkyl esters or the like are entirely suitable.

The condensation proceeds according to the following equation:

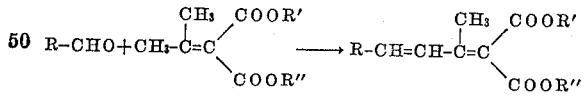

and is effected by reacting the aldehyde and the diester in the presence of a basic condensation catalyst. The catalyst will sometimes be effective to partially or wholly saponify the condensation product when employed in sufficient amounts; although when the diacid is desired, the product is desirably saponified further for optimum yield. Any of the strong bases are suitable as condensation catalysts and preferred catalysts which have been successfully employed include the alkali metals; alkali-metal hydroxides, alkoxides, hydrides and amides; and quaternary ammonium bases. Typical basic condensation catalysts include sodium hydroxide, sodium hydride, potassium hydroxide, tetramethyl ammonium hydroxide, metallic sodium, potassium amide, sodium isopropoxide, tetraethyl ammonium hydroxide, potassium hydride, lithium amide, potassium butoxide and the like.

The reaction is desirably carried out in a suitable organic solvent such as ethyl alcohol, benzene, ethyl ether, naphtha, petroleum ether, methyl alcohol, toluene or similar inert solvent. The condensation can be effected at room temperature but the reaction time is shortened by employing elevated temperatures. If desired, the heating is continued longer than necessary to effect condensation whereby the condensation product is partially or completely saponified by the basic catalyst. When the diacid is desired, the condensation product is saponified in accordance with conventional practices, as for example by heating with sodium or potassium hydroxide, for optimum conversion.

Diacids prepared in accordance with the invention are readily decarboxylated to the corresponding monoacid by controlled heating, preferably in the presence of an organic base such as pyridine, quinoline, triethylamine or diethylaniline, and a metallic catalyst which is desirably a copper-containing material. Suitable copper-containing materials include copper powder, copper-bronze powder, cuprous oxide, copper chromite, cupric oxide, copper acetate and copper sulfate, although other copper salts are eminently suitable. Decarboxylation to the monoacid is desirably effected by heating the diacid to a temperature of from 90°–170° C. although higher or lower temperatures can be employed. The time of heating is dependent upon the temperature employed but usually varies from 15 minutes to 3 hours with longer or shorter heating periods being employed when necessary or desirable.

Monoacids prepared in accordance with this procedure can, of course, be readily esterified by conventional esterification procedures if desired. Preparation of dialcohols is readily effected by reducing the diacid or diester condensation products with ether-soluble metal hydrides. Monoalcohols are prepared by reducing the monoacid or an ester of the monoacid in similar fashion or in accordance with other suitable reducing processes.

Certain preferred embodiments of the invention are illustrated by the following examples, it being understood that the invention is equally applicable to other aldehydes and isopropylidene malonate diesters.

*Example 1*

The preparation of carotenoid polyenes is illustrated by the preparation of vitamin A-$\alpha,\alpha$-diacid as follows. A 5.5 g. portion of $\beta$-ionylidene acetaldehyde was dissolved together with 10 g. of diethyl isopropylidene malonate in 25 cc. of methyl alcohol. To this solution was added 0.5 g. of potassium hydroxide dissolved in 5 cc. of methyl alcohol. The mixture was allowed to stand overnight at about 25° C. whereupon 7 g. of potassium hydroxide in 70 cc. of methyl alcohol was added. After standing for an additional 48 hours, a portion of the alcohol was evaporated from the solution by distillation under nitrogen, and the remainder was diluted with 4 volumes of water and extracted with ether. The alkaline layer was then acidified with dilute hydrochloric acid and extracted with ether to give an extract which was washed, dried over sodium sulfate, and evaporated. The residue weighed 7.4 g. and was a red oil having $$E^{1\%}_{1\,cm.}\,(366m\mu) = 245$$

and was probably the half ester condensation product. This product was then refluxed for 15 minutes with 2 N. potassium hydroxide and enough ethyl alcohol to give complete solution. The $\alpha,\alpha$-vitamin A diacid obtained as product had $$E^{1\%}_{1\,cm.}\,(362m\mu) = 476$$

The product was crystallized from a petroleum ether-ethyl ether mixture to give crystalline, $\alpha,\alpha$-dicarboxy vitamin A diacid melting at 185° C. and having $$E^{1\%}_{1\,cm.}\,(362m\mu) = 1220$$

The utility of the vitamin A diacid as an intermediate in the synthesis of vitamin A is illustrated by the fact that the diacid thus prepared was thereafter decarboxylated to the corresponding vitamin A monoacid by refluxing with pyridine and copper acetate, and the resulting monoacid was reduced to vitamin A alcohol having an assayed potency of 1,600,000 units of vitamin A per gram by treatment with an ether solution of lithium aluminum hydride.

*Example 2*

The preparation of a heterocyclic isoprenic compound is illustrated by the condensation of furfural with an isopropylidene malonate diester. A reaction mixture was prepared by mixing 1 g. of furfural, 4 g. of the diethyl ester of isopropylidene malonic acid, and 1.1 g. of potassium hydroxide with 6 cc. of methyl alcohol. The mixture was allowed to stand for 16 hours at 25° C. Thereafter, 2 g. of potassium hydroxide in 10 cc. of water was added and the mixture was heated for 20 minutes on a steam bath. The saponified product was diluted with water, and extracted with ether, and the alkaline layer was acidified and extracted with ether. The resulting 3-methyl-5(2-furyl)-2,4-pentadieneoic $\alpha,\alpha$-diacid weighed 2.5 g. and had $$E^{1\%}_{1\,cm.}\,(338m\mu) = 877$$

A 2.2 g. portion of this diacid was thereafter dissolved in 10 cc. of pyridine containing 0.025 g. of copper acetate and the solution heated at 100° C. for 45 minutes. The solution was then cooled, poured into ether and washed successively with dilute hydrochloric acid, water, and dilute potassium hydroxide. The alkaline layer was acidified with dilute hydrochloric acid and the monoacid, 3-methyl-5(2-furyl)-2,4-pentadienoic acid, was extracted out with ether. This monoacid melted at 143° C. and had $$E^{1\%}_{1\,cm.}\,(328m\mu) = 1425$$

*Example 3*

To a mixture of 2.1 g. of benzaldehyde and 8 g. of diethyl isopropylidene malonate was added 12 cc. of a solution of 2.2 g. of potassium hydroxide in methyl alcohol. The mixture was allowed to stand for 16 hours at 25° C. and then 2 g. of potassium hydroxide in 10 cc. of water was added and the mixture heated for 20 minutes on a steam bath. After dilution with water, acidification and extraction with ether, an impure diacid fraction weighing 4.7 g. and having $$E_{1\ cm.}^{1\%}\ (315 m\mu) = 760$$

was obtained. After crystallization, 3-methyl-5-phenyl-2,4-pentadienoic α,α-diacid was obtained having $$E_{1\ cm.}^{1\%}\ (327 m\mu) = 1020$$

This diacid was decarboxylated by the method set out in Example 2 to give pale orange crystals of 3-methyl-5-benzyl-2,4-pentadienoic acid having a melting point of 152–153° C. and $$E_{1\ cm.}^{1\%}\ (309 m\mu) = 1400$$

As is obvious from the examples, similar condensations are readily effected with other alkyl, aryl and aralkyl esters of isopropylidene malonic acid. It has been found also that any of the well-known strong bases are effective to catalyze the condensations embodying this invention. The condensation embodying the invention is also equally applicable to a variety of other aldehydes as well as the cyclic aldehydes with which it is of especial utility. Thus, by means of this invention, citral is readily condensed with isopropylidene malonate diester to form a diacid which is decarboxylated to pseudo-ionylidene acetic acid. This compound is important as an intermediate in the synthesis of phytol which in turn finds utility in the synthesis of tocopherols. In like manner, butyraldehyde is condensed with isopropylidene malonate diester to give a diacid which is thereafter decarboxylated to 3-methyl-2,4-octadienoic acid. Acrolein condenses with isopropylidene malonate diesters to give, after saponification the compound 3-methyl-2,4,6,-heptatrienoic α,α-diacid which can be decarboxylated to 3-methyl-2,4,6-heptatrienoic acid.

The invention thus furnishes a simple method of synthesizing isoprenic polyenes. While the invention has been described in considerable detail with reference to certain preferred embodiments, it will be understood that variations and modifications can be effected within the spirit and scope of the invention as described hereinabove and as defined in the appended claims.

What I claim is:

1. As a new chemical compound, α,α-vitamin A diacid of the formula

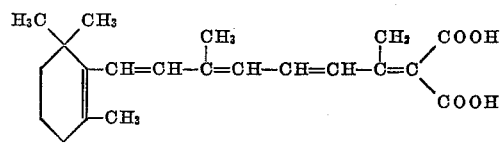

2. The method of making a β-methyl-1,4-diene α,α-dicarboxylate which comprises condensing an aldehyde with an isopropylidene malonate diester in the presence of a basic condensation catalyst, said aldehyde containing 2 to 15 carbon atoms and but a single carbonyl group, said aldehyde consisting solely of carbon and hydrogen except for the single oxo oxygen of said carbonyl group.

3. The method of making a β-methyl-1,4-diene-α,α-dicarboxylate which comprises condensing an olefinically-unsaturated aldehyde with an isopropylidene malonate diester in the presence of a basic condensation catalyst, said olefinically unsaturated aldehyde containing 2 to 15 carbon atoms and but a single carbonyl group, said olefinically-unsaturated aldehyde consisting solely of carbon and hydrogen except for the single oxo oxygen of said carbonyl group.

4. The method of making a β-methyl-1,4-diene-α,α-dicarboxylate which comprises an aldehyde with an isopropylidene malonate diester in the presence of a basic condensation catalyst and saponifying the resulting condensation product to the corresponding β-methyl-1,4-dienoic α,α-diacid, said aldehyde containing 2–15 carbon atoms and but a single carbonyl group, said aldehyde consisting solely of carbon and hydrogen except for the single oxo oxygen of said carbonyl group.

5. The method which comprises condensing β-ionylidene acetaldehyde with an isopropylidene malonate diester in the presence of a basic condensation catalyst, and saponifying the resulting condensation product to α,α-vitamin A diacid of the formula

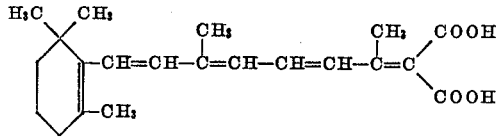

6. The method which comprises condensing citral with an isopropylidene malonate diester in the presence of a basic condensation catalyst, and saponifying the resulting condensation product to pseudo-ionylidene acetic α,α-diacid of the formula

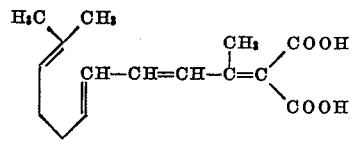

CHARLES D. ROBESON.

References Cited in the file of this patent

UNITED STATES PATENTS

| Number | Name | Date |
|---|---|---|
| 2,381,882 | Cupery | Aug. 14, 1945 |
| 2,515,595 | Geyer et al. | July 18, 1950 |

OTHER REFERENCES

Cope et al., J. Am. Chem. Soc., vol. 63, pp. 1843–52 (1941).

Van Dorp et al., Rec. des Trav. Chim des Pays-Bas, vol. 65, No. 6, p. 339 (1946).

Adams et al., "Organic Reactions," vol. 1, p. 227 (1942).

Block, Chemical Reviews, vol. 38, pp. 544–547 (1946).